US008825003B2

(12) United States Patent
Ravishankar et al.

(10) Patent No.: US 8,825,003 B2
(45) Date of Patent: Sep. 2, 2014

(54) METHODS, SYSTEMS, AND COMPUTER READABLE MEDIA FOR PROVIDING VARIABLE RATE PREPAID TELECOMMUNICATION SERVICES UTILIZING A WEIGHTING FUNCTION

(75) Inventors: Venkataramaiah Ravishankar, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 190 days.

(21) Appl. No.: 12/335,416

(22) Filed: Dec. 15, 2008

(65) Prior Publication Data
US 2009/0156163 A1   Jun. 18, 2009

Related U.S. Application Data

(60) Provisional application No. 61/013,520, filed on Dec. 13, 2007.

(51) Int. Cl.
| | |
|---|---|
| *H04M 11/00* | (2006.01) |
| *H04M 15/00* | (2006.01) |
| *G06F 17/00* | (2006.01) |
| *G07B 17/02* | (2006.01) |
| *H04L 12/14* | (2006.01) |
| *H04M 17/00* | (2006.01) |

(52) U.S. Cl.
CPC ............ *H04L 12/14* (2013.01); *H04L 12/1467* (2013.01); *H04M 15/81* (2013.01); *H04M 2215/0112* (2013.01); *H04M 17/00* (2013.01); *H04M 15/80* (2013.01); *H04M 2215/7421* (2013.01); *H04M 15/8022* (2013.01); *H04M 2215/74* (2013.01)
USPC ................... 455/406; 379/114.06; 379/114.2; 705/409

(58) Field of Classification Search
USPC ........ 455/405, 406, 407, 409, 408; 379/114.2
See application file for complete search history.

(56) References Cited

U.S. PATENT DOCUMENTS

| | | | |
|---|---|---|---|
| 5,570,416 A | 10/1996 | Kroll | |
| 6,195,543 B1 * | 2/2001 | Granberg | ...................... 455/407 |

(Continued)

FOREIGN PATENT DOCUMENTS

| | | |
|---|---|---|
| CN | 1323500 A | 11/2001 |
| CN | 101971653 A | 2/2011 |

(Continued)

OTHER PUBLICATIONS

Notification of Transmittal of the International Search Report and the Written Opinion of the International Searching Authority, or the Declaration for corresponding International Application No. PCT/US2008/086866 (May 25, 2009).
Communication of European publication number and information on the application of Article 67(3) EPC for European application No. 08859561.6 (Sep. 1, 2010).
First Office Action for Chinese Patent Application No. 200880126771.8 (Oct. 10, 2012).
Second Office Action for Chinese Patent Application No. 200880126771.8 (Sep. 4, 2013).

(Continued)

*Primary Examiner* — Dwayne Bost
*Assistant Examiner* — Christopher Kohlman
(74) *Attorney, Agent, or Firm* — Jenkins, Wilson, Taylor & Hunt, P.A.

(57) ABSTRACT

Methods, systems, and computer program products for providing variable rate prepaid telecommunication services utilizing a weighting function are disclosed. The method includes intercepting a signaling message that includes an available credit value associated with a prepaid communications session. A credit adjustment factor based on at least one call parameter associated with the prepaid communications session is determined. The method also includes applying the credit adjustment factor to the available credit value to generate an adjusted available credit value. The signaling message is modified to include the adjusted available credit value.

25 Claims, 6 Drawing Sheets

(56) References Cited

U.S. PATENT DOCUMENTS

| | | | |
|---|---|---|---|
| 6,393,269 B1* | 5/2002 | Hartmaier et al. | 455/406 |
| 6,965,667 B2 | 11/2005 | Trabandt et al. | |
| 7,787,858 B2* | 8/2010 | Koskinen et al. | 455/405 |
| 2001/0040949 A1* | 11/2001 | Blonder et al. | 379/144.01 |
| 2005/0136889 A1* | 6/2005 | Zackrisson et al. | 455/406 |
| 2006/0148446 A1* | 7/2006 | Karlsson | 455/406 |
| 2006/0286963 A1* | 12/2006 | Koskinen et al. | 455/405 |
| 2007/0242816 A1* | 10/2007 | Cai et al. | 379/127.05 |
| 2007/0280447 A1* | 12/2007 | Cai et al. | 379/114.03 |
| 2009/0061856 A1* | 3/2009 | Kazmi | 455/433 |
| 2010/0010922 A1 | 1/2010 | Foottit et al. | |
| 2012/0202455 A1* | 8/2012 | Cai | 455/406 |
| 2013/0176908 A1 | 7/2013 | Baniel et al. | |

FOREIGN PATENT DOCUMENTS

| | | |
|---|---|---|
| EP | 2 398 262 A1 | 12/2011 |
| JP | 2002-204319 | 7/2002 |
| WO | WO 00 19702 | 4/2000 |
| WO | WO 00/22871 | 4/2000 |
| WO | WO 03/073693 A1 | 9/2003 |
| WO | WO 2013/103960 A1 | 7/2013 |

OTHER PUBLICATIONS

Notification of Transmittal of the International Search Report and the Written Opinion of the International Searching Authority, or the Declaration for International Application No. PCT/US2013/020528 (Apr. 29, 2013).

Commonly-assigned, co-pending U.S. Appl. No. 13/832,115 for "Methods, Systems, and Computer Readable Media for Adjusting a Quota Consumption Rate," (Unpublished, filed Mar. 15, 2013).

"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).

Tekelec et al., "Discussion paper on Usage-reporting from PCRF to OCS over Sy," 3GPP TSG SA WG2 #86, pp. 1-2 (Jul. 11-15, 2011).

Ericsson et al., "IE provided over Sy interface," 3GPP TSG SA WG2 #83, TD S2-110980, pp. 1-7 (Feb. 2011).

Cheboldaeff, "Interaction between an Online Charging System and a Policy Server," ICN 2011: The Tenth International Conference on Networks, pp. 47-51 (2011).

\* cited by examiner

Exemplary Prepaid Services Weighting Function Rules 122

202

| CdPN / PREMIUM SERVICE ID | CREDIT MULTIPLIER |
|---|---|
| CdPN1 | .4 |
| CdPN2 | 1.1 |

204

| TIME OF DAY | DAY OF WEEK | CREDIT MULTIPLIER |
|---|---|---|
| 8am - 8pm | Wknd | .4 |
| * | Wkday | 1.1 |

206

| ROAMING NETWORK OPERATOR ID | CREDIT MULTIPLIER |
|---|---|
| MVNO1 | 1.3 |
| MNO2 | 1.1 |

208

| TYPE OF SERVICE | CREDIT MULTIPLIER |
|---|---|
| VIDEO CALL | .75 |
| VOICE CALL | 1.0 |
| DATA SESSION | 1.1 |

FIG. 2

METHODS, SYSTEMS, AND COMPUTER READABLE MEDIA FOR PROVIDING VARIABLE RATE PREPAID TELECOMMUNICATION SERVICES UTILIZING A WEIGHTING FUNCTION

RELATED APPLICATIONS

The present application claims the benefit of U.S. Provisional Patent Application Ser. No. 61/013,520, filed Dec. 13, 2007, the disclosure of which is incorporated herein by reference in its entirety.

TECHNICAL FIELD

The subject matter described herein relates to prepaid services in a communications network. More particularly, the subject matter described herein relates to methods, systems, and computer program products for providing variable rate prepaid telecommunication services utilizing a weighting function.

BACKGROUND

In a telecommunications network, subscribers may be classified as prepaid subscribers and postpaid subscribers. Postpaid subscribers typically register with a service provider and pay a monthly fee in order to receive telecommunications services. In contrast, a prepaid subscriber normally deposits an arbitrary amount of funds into an account prior to making any calls. As the prepaid subscriber makes calls, the account is debited in accordance with the duration of the calls. Oftentimes, prepaid accounts are configured so that all calls made by the prepaid subscriber are made at a specific rate irrespective of the destination or called party (e.g., $0.15 per minute). Thus, if the subscriber calls a local number, the prepaid subscriber is charged $0.15 per minute. Similarly, if the prepaid subscriber makes a long distance call the call is still charged $0.15 per minute.

While these static prepaid calling plans are convenient in many ways, problems can arise in certain situations. For example, suppose a prepaid subscriber wishes to contact a premium service, such as a weather information number, a sports information number, or the like. It may be desirable to charge more for calls to these services than calls to non-premium destinations. However, using a prepaid calling card or phone, such differential billing is not possible. As a result, one of two problems may occur. In one scenario, the subscriber may be prohibited by the service provider from calling premium services with the prepaid phone or service plan. Alternatively, the prepaid subscriber may be permitted to communicate with the premium services at the subscriber's prepaid calling rate. In this type of situation, since the prepaid subscription rate is often lower in cost than the calling rates associated with a premium service, a subscriber may effectively make "reduced rate" calls at the expense of the service provider.

Accordingly, there exists a need for methods, systems, and computer program products for providing variable rate prepaid telecommunications services using a weighting function.

SUMMARY

The subject matter described herein includes a method for providing variable rate prepaid telecommunication services utilizing a weighting function. In one embodiment, the method includes intercepting a signaling message that includes an available credit value associated with a prepaid communications session. A credit adjustment factor based on at least one call parameter associated with the prepaid communications session is determined. The method also includes applying the credit adjustment factor to the available credit value to generate an adjusted available credit value. The signaling message is modified to include the adjusted available credit value.

The subject matter described herein for applying a prepaid weighting function may be implemented using a computer readable media comprising computer executable instructions embodied in a tangible computer readable medium that are executed by a computer processor. Exemplary computer readable media suitable for implementing the subject matter described herein includes disk memory devices, programmable logic devices, application specific integrated circuits, and the like. In one implementation, the computer readable medium may include a memory accessible by a processor. The memory may include instructions executable by the processor for implementing any of the methods for applying a prepaid weighting function described herein. In addition, a computer readable medium that implements the subject matter described herein may be distributed across multiple physical devices and/or computing platforms.

The subject matter described herein for applying a prepaid weighting function may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for applying a prepaid weighting function described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which:

FIG. 2 is an exemplary prepaid service weighting function rules database structure according to an embodiment of the subject matter described herein;

DETAILED DESCRIPTION

The present subject matter relates to systems and methods for providing variable rate prepaid telecommunication services utilizing a weighting function in a communications network. According to one embodiment of the present subject matter, a prepaid weighting function is provisioned in a network routing element which is used to scale a prepaid subscriber's allotted minutes (or other indicator of credit), for example, based on the type of telecommunications service being called. For example, if a subscriber has 30 minutes available for standard calling, the number of available minutes may be adjusted to 15 minutes for a call to a premium service (e.g., stock quote service, traffic report service, weather report service, gaming service, banking/financial service, etc.). In an alternate implementation, the amount of available funds may be adjusted, for example, based on a type of service associated with a call (e.g., video, voice, multimedia, text), the time of day associated with a call, day of the week associated with a call, a roaming network operator associated with the call.

Figure 1:
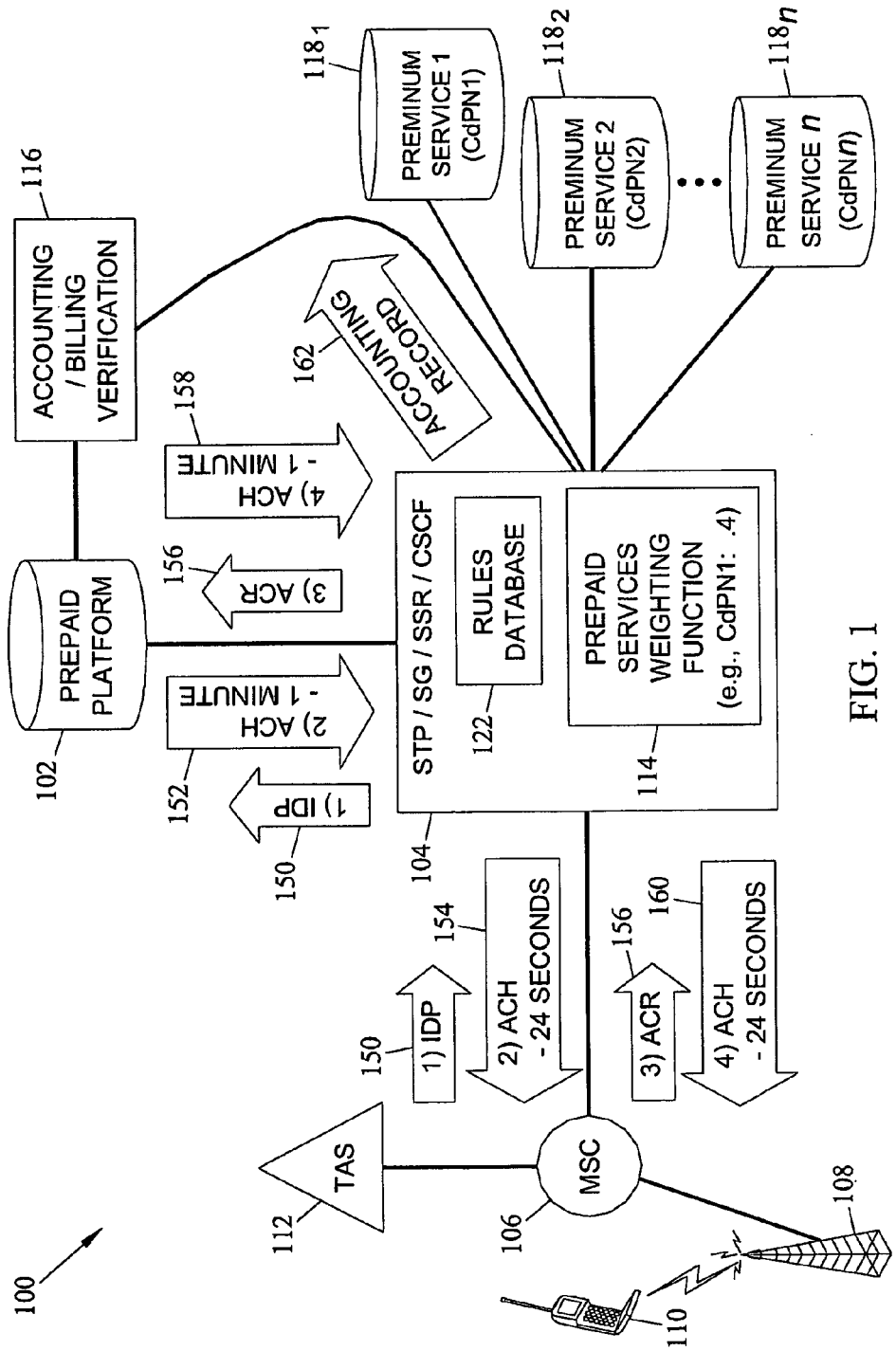
FIG. 1 is a network diagram that illustrates an exemplary communications network utilizing a prepaid service weighting function according to an embodiment of the subject matter described herein.

FIG. 1 is a network diagram of an exemplary communications network 100 that includes a prepaid services weighting function (PSWF) 114 that is used to provide variable rate telecommunications services to prepaid mobile subscribers according to an embodiment of the subject matter described herein. As will be described in greater detail below, PSWF 114 may intercept and subsequently modify a signaling message associated with a communications session involving a prepaid subscriber.

Referring to FIG. 1, communications network 100 may include a prepaid platform database 102, a network routing element (NRE) 104, a mobile switching center (MSC) 106, a base station system (BSS) 108, a mobile calling device 110, a tone/announcement server 112, an accounting and billing element 116, and a plurality of premium service elements $118_1 \ldots _n$. In one embodiment, mobile calling device 110 may include a mobile phone associated with a prepaid subscription plan. The prepaid subscription plan may include a calling plan that charges a specific rate (e.g., $0.15/minute) for local and long distance calls. In one exemplary scenario, mobile calling device 110 may attempt to initiate communication with a premium service $118_1$ (e.g., CdPN1) by sending a call initiation signal to MSC 106 via BSS 108. Upon receiving a call initiation signal from mobile calling device 110, MSC 106 inspects the called party number (CdPN) and determines that the caller is a prepaid subscriber. MSC 106 initially sends a query signaling message 150 (e.g., an IDP message) to prepaid platform 102 via network routing element (NRE) 104.

Network routing element 104 may include a signal transfer point (STP), an SS7-IP signaling gateway (SG), a SIP server, an IP multimedia subsystem (IMS) node, a call session control function (CSCF), a softswitch, a media gateway controller, or any other like network component adapted to receive and route call signaling messages. In one embodiment, NRE 104 may support PSWF 114, which is responsible for handling the prepaid services weighting processing of signaling messages that traverse NRE 104. Integrating a PSWF 114 in an STP is beneficial because a pre-paid service provider is able to implement variable rate charging without the addition of requiring expensive upgrades to a prepaid platform.

Among other capabilities, PSWF 114 may be configured to determine a weighting adjustment factor for the call based on one or more call parameters discussed below. In one embodiment, PSWF 114 may be made up of a hardware component, a firmware component, a software module executed by a processor, or a combination thereof. In an alternate embodiment of the present invention, a PSWF may be deployed on a platform that is independent of a NRE. For example, a PSWF may be deployed as a stand-alone node in front of a prepaid platform, where the node is adapted to observe, intercept, and potentially modify signaling messages going to and/or coming from the prepaid platform.

In one embodiment, NRE 104 may include a PSWF rules database 122 that contains a listing of various call parameters that may be associated with different telecommunications services or other factors that may affect prepaid billing. An exemplary PSWF rules database 122 is depicted in FIG. 2. In one embodiment, PSWF rules database 122 may contain a plurality of data structures 202-208 that relate to various types of call parameters that may be used to vary a billing rate for prepaid calls. For example, rules database 122 may include a called party number data structure 202, a time of day data structure 204, a roaming network operator identifier data structure, and a service type data structure 208. Even though FIG. 2 lists various examples of call parameters that may be used to vary a prepaid billing rate for a call, the present subject matter is not limited to these examples. Namely, additional data structures, data structures with additional fields, or different data structures may exist without departing from the scope of the present subject matter. Each of data structures 202-208 associates a given call parameter with a corresponding credit adjustment factor. For example, called party number data structure 202 lists a plurality of called party numbers associated with premium services. Each of these premium service CdPNs, in turn, corresponds to a specific credit adjustment factor. The credit adjustment factor is a number which is used by PSWF 114 to scale or convert a prepaid subscriber's available minutes to an appropriate amount in relation to the premium service being called. A credit adjustment factor may be represented by any type of number. For example, calls that have a more expensive rate than the subscriber's existing prepaid rate, the credit adjustment factor may include a numerical value that is a fraction of 1.0, so that when multiplied by a subscriber's available minutes, the number of available minutes will be decreased for premium services. Similarly, for calls to premium services that charge less than the default prepaid rate, the credit adjustment factor may include a number that is greater than 1.0, so that when multiplied by a subscriber's available minutes, the number of available minutes will be increased for non-premium services. An example of using a credit adjustment factor is presented below. Since different individual subscribers may have different prepaid calling rates, rules database 122 can be configured such that a unique set of data structures 202-208 with a unique set of call multiplier factors may exist for each prepaid subscriber.

Returning to FIG. 1, prepaid platform 102 may serve as a dedicated network element responsible for maintaining prepaid account balances associated with a plurality of prepaid subscribers. Upon receiving a query signaling message (e.g., an IDP message originally sent from MSC 106) routed by NRE 104, prepaid platform 102 may access an internal database to inspect an account associated with the prepaid subscriber initiating the call. For example, prepaid platform 102 may ascertain the amount of remaining funds (e.g., dollar amount) or balance of credit (e.g., "minutes") associated with the calling party number (CgPN) identifier (i.e., a subscription number) indicated in the received query signaling message.

Upon determining the presence of sufficient funds, prepaid platform 102 may send a response message 152 (e.g., an ApplyCharging (ACH) operation message) back to MSC 106. In one embodiment, response message 152 contains an available credit value that represents at least a portion of the subscriber's outstanding balance or total minutes. More specifically, the available credit value may be used to indicate the amount of time the prepaid caller is authorized to use in a given prepaid call (without further prompting by MSC 106) by prepaid platform 102. In one embodiment, the available credit value may include a portion of the total amount of authorized time (e.g., 1 minute of a total of 57 remaining minutes). As such, the prepaid platform may provide the available credit value in the ACH message, which is sent to the querying MSC, and simultaneously debit that available credit value from the subscriber's prepaid account balance. In an alternate embodiment, the available credit value may include the entire balance of credit or minutes in the prepaid subscriber's account.

After being sent to MSC 106, response message 152 is intercepted by PSWF 114 in NRE 104. In one embodiment, PSWF 114 inspects response message 152 and recognizes the presence of the available credit value, which represents an authorized amount that may be used to contact premium service $118_1$ (i.e., the called party number indicated in the response message). PSWF 114 may then access prepaid service weighting function rules database 122 to determine if any weighting functions may be applied to the existing prepaid rate in light of the call being placed. More specifically, PSWF 114 may inspect the response message to determine if any of the call parameters listed in database 122 are applicable to the prepaid communications session. For example, the response message may contain certain call parameters, such as the CdPN identifier, the current time and date, the type of the call mobile calling device 110 wishes to establish, a roaming network operator identifier (if applicable), or the like. PSWF 114 cross-references one or more of these call parameters with data structures 202-208. For instance, because mobile calling device 110 is attempting to call premium service $118_1$ in the exemplary scenario, PSWF 114 may cross-reference the CdPN identifier (e.g., CdPN1) with data structure 202. As a result, PSWF 114 determines that a credit adjustment factor of 0.4 is associated with premium service $118_1$. In an alternate embodiment, PSWF function 114 may intercept, extract and buffer call parameters from an IDP or ACR message associated with a prepaid transaction. The PSWF function is then adapted to intercept an ACH message associated with the prepaid transaction and to correlate the ACH with the call parameters extracted from the previously intercepted IDP/ACR message. The associated call parameters are then used to determine the appropriate credit adjustment factor.

Once an applicable credit adjustment factor is located, PSWF 114 applies the credit adjustment factor to the available credit value contained in the response message (e.g., 1 minute). In one embodiment, an adjusted available credit value is determined by simply multiplying the available credit value with the credit adjustment factor (e.g., 60 seconds× 0.4=24 seconds). Notably, the adjusted available credit value represents the actual amount of time the prepaid subscriber is authorized to communicate with premium service $118_1$. After the adjusted available credit value is generated, PSWF 114 inserts the adjusted available credit value into the response message (or alternatively, generates a new response message with the adjusted available credit value) thereby replacing the original available credit value. PSWF 114 sends the "adjusted" response message 154 to MSC 106.

Upon receiving response message 154 containing the adjusted available credit value, MSC 106 sends a call signaling message to establish the connection with the intended destination (i.e., premium service $118_1$). As the call between mobile calling device 110 and premium service $118_1$ transpires, MSC 106 keeps track of the duration of the call or communications session. When the authorized duration (e.g., 24 seconds) is close to expiring, MSC 106 sends a query signaling message 156 (e.g., an ApplyChargingReport (ACR) operation message) to prepaid platform 102. Upon receiving query signaling message 156, prepaid platform 102 accesses its internal database(s) to determine the outstanding balance of credit (or time) associated with the prepaid subscriber. In a manner similar to responding to initial IDP message 150, prepaid platform 102 sends a response message 158 (e.g., an ACH message) containing an available credit value to MSC 106 via NRE 104.

After receiving (i.e., intercepting) response message 158, PSWF 114 executes the weighting process once again. For example, PSWF 114 recognizes that response message 158 contains available funds or available time. PSWF 114 then cross-references call parameters contained in response message 158 with data structures contained in database 122. Returning to the example presented above, PSWF 114 cross references the CdPN identifier (e.g., CdPN1) with data structure 202 since mobile calling device 110 is involved in a call with premium service $118_1$. As before, PSWF 114 determines that a credit adjustment factor of 0.4 is associated with CdPN1 and applies the credit adjustment factor to the available credit value contained in response message 158 to generate an adjusted available credit value. The "adjusted" response message 160, which contains the adjusted available credit value, is then sent to MSC 106.

This process may continue in a repetitive manner until the call is terminated or the prepaid funds are depleted. For example, upon receiving a message (e.g., an ACR message) from MSC 106, prepaid platform 102 accesses its internal database(s) to determine the amount of the outstanding balance of credit (or time) associated with the prepaid subscriber. If prepaid platform 102 determines that no funds remain, then a message is sent to MSC 106 indicating the depletion of the subscriber prepaid account. In one embodiment, a tone/announcement server (TAS) 112 may be used in cooperation with MSC 106 to provide an audible tone or verbal message that indicates the depletion of credit to the mobile calling device 110. The TAS may also be configured to provide a tone or message to the prepaid subscriber prior to the depletion of credit (i.e., to serve as a warning).

In one embodiment, an accounting/billing verification element 116 is utilized in communications network 100. The accounting/billing verification element 116 may reside in a network operations center (NOC) or the like. Accounting/billing verification element 116 may be adapted to receive an accounting record message 162 from NRE 104. In one embodiment, accounting record message 162 may include the duration of the call session between the prepaid mobile subscriber and the called party (e.g., a premium service). Although prepaid platform 102 has already deducted the prepaid subscription of the authorized minutes (e.g., upon the sending of an ACH message that included the available credit value), the information obtained from NRE 104 via the accounting record message may be used by a service provider to verify the accounting performed by prepaid platform 102. This data may then be used to generate bills or confirm billing inquiries.

Figure 3:
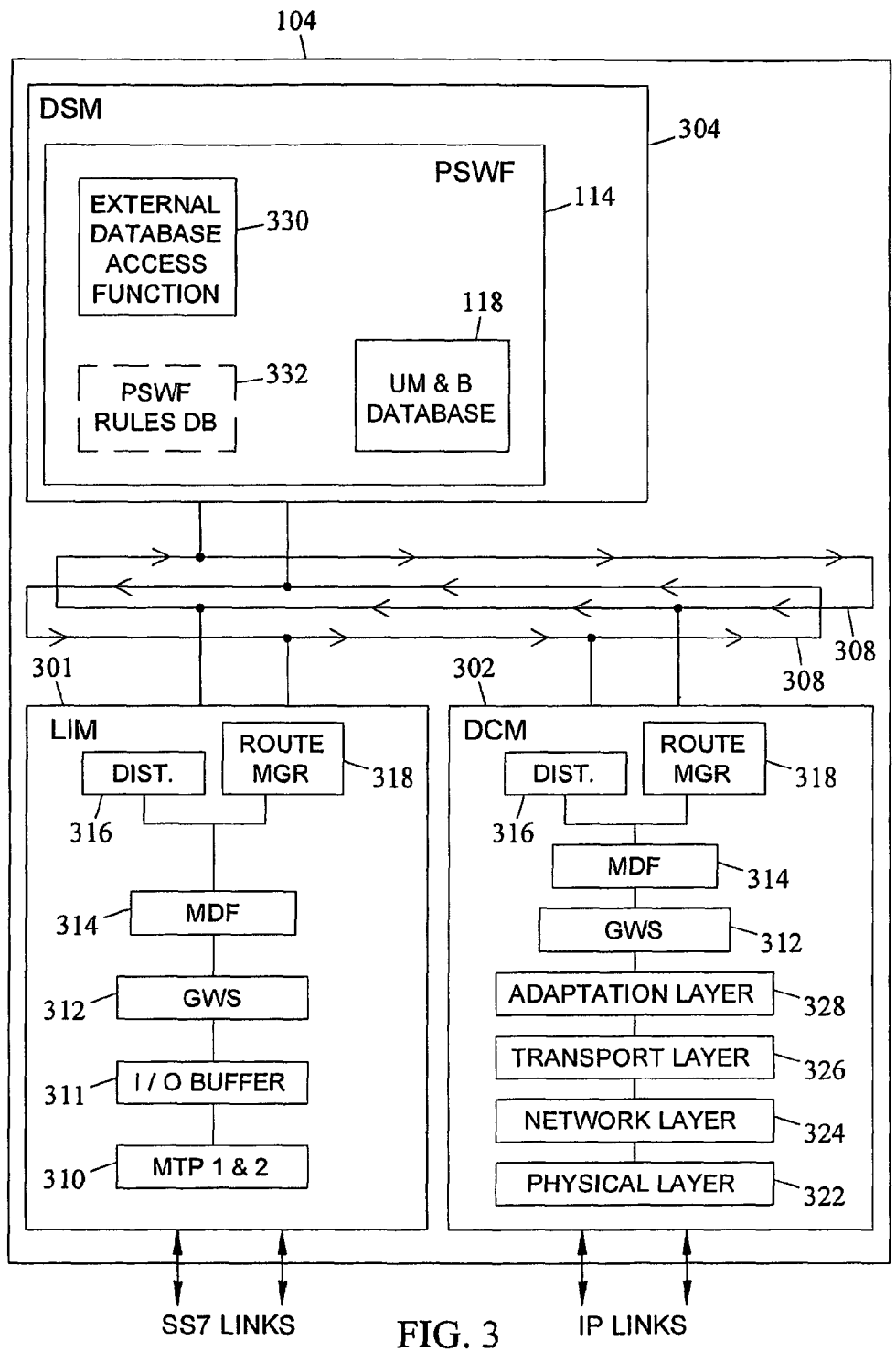
FIG. 3 is a depicts exemplary architecture of a network routing element configured to utilize a prepaid service weighting function according to an embodiment of the subject matter described herein.

FIG. 3 is a block diagram of an exemplary internal architecture of a signaling message routing node (e.g., NRE 104) provisioned with a prepaid services weighting function 114 according to an embodiment of the subject matter described herein. Referring to FIG. 3, NRE 104 may include an internal communications bus 308 that includes two counter-rotating serial rings. In one embodiment, the logic for determining whether to apply a prepaid services weighting function to a given call or communications session is integrated within NRE 104. As a result, no additional platforms, hardware, or nodes are needed to apply credit adjustment factors to prepaid calls. This may be advantageous in the sense that existing prepaid platforms (e.g., prepaid platform 102) do not have to be modified. A number of processing modules or cards may be coupled to bus 308. In FIG. 3, bus 308 may be coupled to a communications module, such as a link interface module (LIM) 301, a data communications module (DCM) 302, and a database service module (DSM) 304. These modules are physically connected to bus 308 such that signaling and other types of messages may be routed internally between active cards or modules. For simplicity of illustration, only a single LIM card, a single DCM card, and a single DSM card are included in FIG. 3. However, NRE 104 may include multiple other LIMs, DCMs, DSMs, and other card types, all of which may be simultaneously connected to and communicating via bus 308.

Each module 301, 302, and 304 may execute the applications or functions that reside on each module and control communication with other modules via bus 308. For example, DSM 304 may execute software (e.g., via a processor or the like) that applies the aforementioned prepaid services weighting function to communications sessions involving a prepaid subscriber and one or more premium call services.

LIM 301 may include an SS7 MTP level 1 and 2 function 310, an I/O buffer 311, a gateway screening (GWS) function 312, a message discrimination function 314, a message distribution function 316, and a route manager 318. MTP level 1 and 2 function 310 sends and receives digital data over a particular physical interface, provides error detection, error correction, and sequenced delivery of SS7 message packets. I/O buffer 311 provides temporary buffering of incoming and outgoing signaling messages. Although PSWF 114 is shown to be located in DSM 304, those skilled in the art realize that PSWF 114 may be implemented on LIM 301 or DCM 302.

GWS function 312 examines received message packets and determines whether the message packets should be allowed into NRE 104 for PSWF processing and/or routing. Discrimination function 314 performs discrimination operations, which may include determining whether the received message packet requires processing by an internal processing subsystem or is simply to be through-switched (i.e., routed on to another node in the network). Messages that are permitted to enter NRE 104, such as messages that require PSWF processing, may be routed to other communications modules in the system or distributed to an application engine or processing module via bus 308.

DCM 302 includes functionality for sending and receiving SS7 messages over IP signaling links. In the illustrated example, DCM 302 includes a physical layer function 322, a network layer function 324, a transport layer function 326, an adaptation layer function 328, and functions 312, 316, and 318 described above with regard to LIM 301. Physical layer function 322 performs open systems interconnect (OSI) physical layer operations, such as transmitting messages over an underlying electrical or optical interface. In one example, physical layer function 322 may be implemented using Ethernet. Network layer function 324 performs operations, such as routing messages to other network nodes. In one implementation, network layer function 324 may implement Internet protocol. Transport layer function 326 implements OSI transport layer operations, such as providing connection oriented transport between network nodes, providing connectionless transport between network nodes, or providing stream oriented transport between network nodes. Transport layer function 326 may be implemented using any suitable transport layer protocol, such as stream control transmission protocol (SCTP), transmission control protocol (TCP), or user datagram protocol (UDP). Adaptation layer function 328 performs operations for sending and receiving SS7 messages over IP transport. Adaptation layer function 328 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 312, 316, and 318 perform the same operations as the corresponding components described above with regard to LIM 301.

When a signaling message relating associated with a prepaid mobile subscriber is received, the message may first be processed by either LIM 301 or DCM 302, depending on whether the message is sent over an SS7 or an IP signaling link. The message is passed up the communications protocol stack on the receiving communication module until it reaches message discrimination function 314. Message discrimination function 314 may identify messages, such as ACH messages that require prepaid screening weighting processing.

If discrimination function 314 determines that the signaling message is sent from prepaid platform 102 and requires PSWF processing. Message discrimination function 314 forwards the message to distribution function 316, which forwards the message to DSM 304. If discrimination function 314 determines that the message does not require PSWF processing, discrimination function may be forward the message to route manager 318, which routes the messages.

PSWF rules database 122 is accessed by external database access function 330 which uses at least one of a calling party identifier number or a called party identifier number to determine the appropriate PSWF action to be taken. In an alternate embodiment, the PSWF rules database may be positioned within PSWF 114 (e.g., as shown in FIG. 3 as internal PSWF rules database 332). PSWF 114 may also include a usage measurements and billing (UM&B) database 118, which is adapted to maintain usage measurements and billing information for prepaid subscriber accounts.

Figure 4:
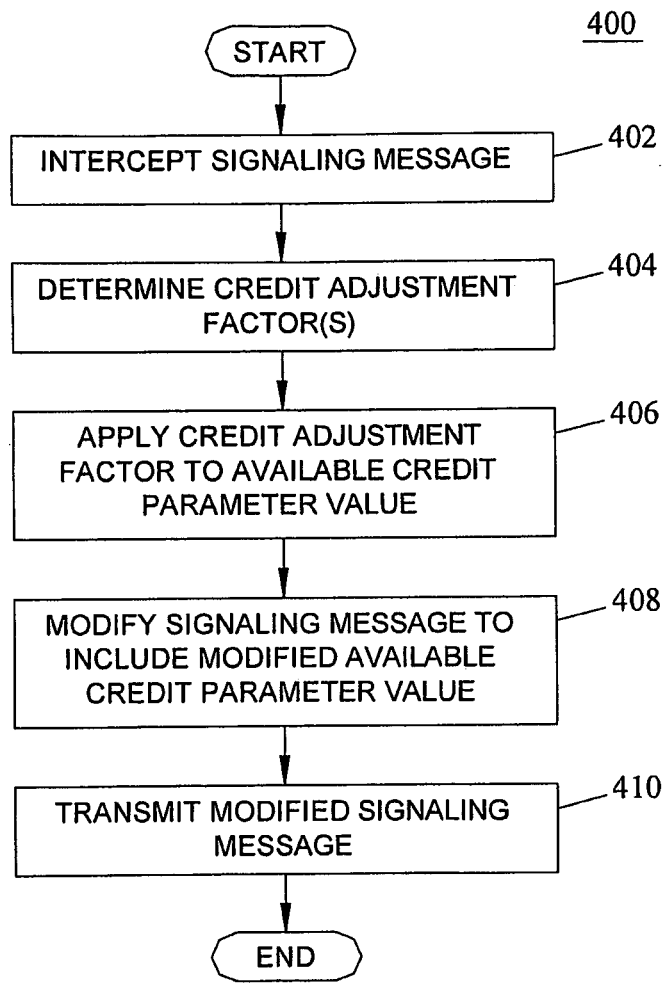
FIG. 4 is a flow chart of exemplary steps for providing utilizing a prepaid weighting function to provide variable rate telecommunications services according to an embodiment of the subject matter described herein.

FIG. 4 is a flow chart of a method 400 that includes exemplary steps for providing variable rate prepaid services to a prepaid subscriber according to an embodiment of the subject matter described herein. Referring to FIG. 4, in block 402, a signaling message is intercepted. In one embodiment, prepaid service weighting function (PSWF) 114 intercepts ACH signaling message 152 transmitted by prepaid platform 102. For example, prepaid platform 102 transmits ACH message 152 in response to IDP query message 150 initially sent by MSC 106. In one embodiment, ACH signaling message 152 includes an available credit value which is ultimately used by MSC 106 to determine if prepaid mobile subscriber 110 has sufficient credit to establish (or continue) the desired call (according to prepaid platform 102). IDP query message 150 is received by prepaid platform 102, which then accesses the subscriber's account. However, before being received by MSC 106, ACH message 152 is intercepted by PSWF 114.

In block 404, a credit adjustment factor is determined. In one embodiment, PSWF 114 accesses one or more data structures in rules database 122 in order to determine which credit adjustment factor(s), if any, should be applied to the available credit value contained in the intercepted ACH message 152. PSWF 114 may use information contained in the signaling message, such as the called party identifier, the time of day, the type of service, roaming service provider, and the like, in order to ascertain what credit adjustment factor should be used. In an alternate embodiment, a plurality of credit adjustment factors may be applicable to a given call.

In block 406, the credit adjustment factor is applied to an available credit value. In one embodiment, PSWF 114 applies the credit adjustment factor determined in block 404 to the available credit value contained in the intercepted message. For example, if PSWF 114 determines that premium service $118_1$ (i.e., CdPN1) is the destination number, then the available credit value (e.g., 60 seconds) is multiplied by the corresponding credit multiplier (e.g., 0.4) to obtain a modified available credit value (e.g., 24 seconds).

In block 408, the signaling message is adjusted to include the modified available credit value. In one embodiment, PSWF 114 is configured to insert the modified available credit value into the response signaling message (e.g., ACH message 154) in the place of the original available credit value. In an alternate embodiment, PSWF 114 generates a new response signaling message that includes the modified available credit value.

In block 410, the modified signaling message is transmitted. In one embodiment, NRE 104 is adapted to transmit the modified ACH message to MSC 106.

Figure 5:
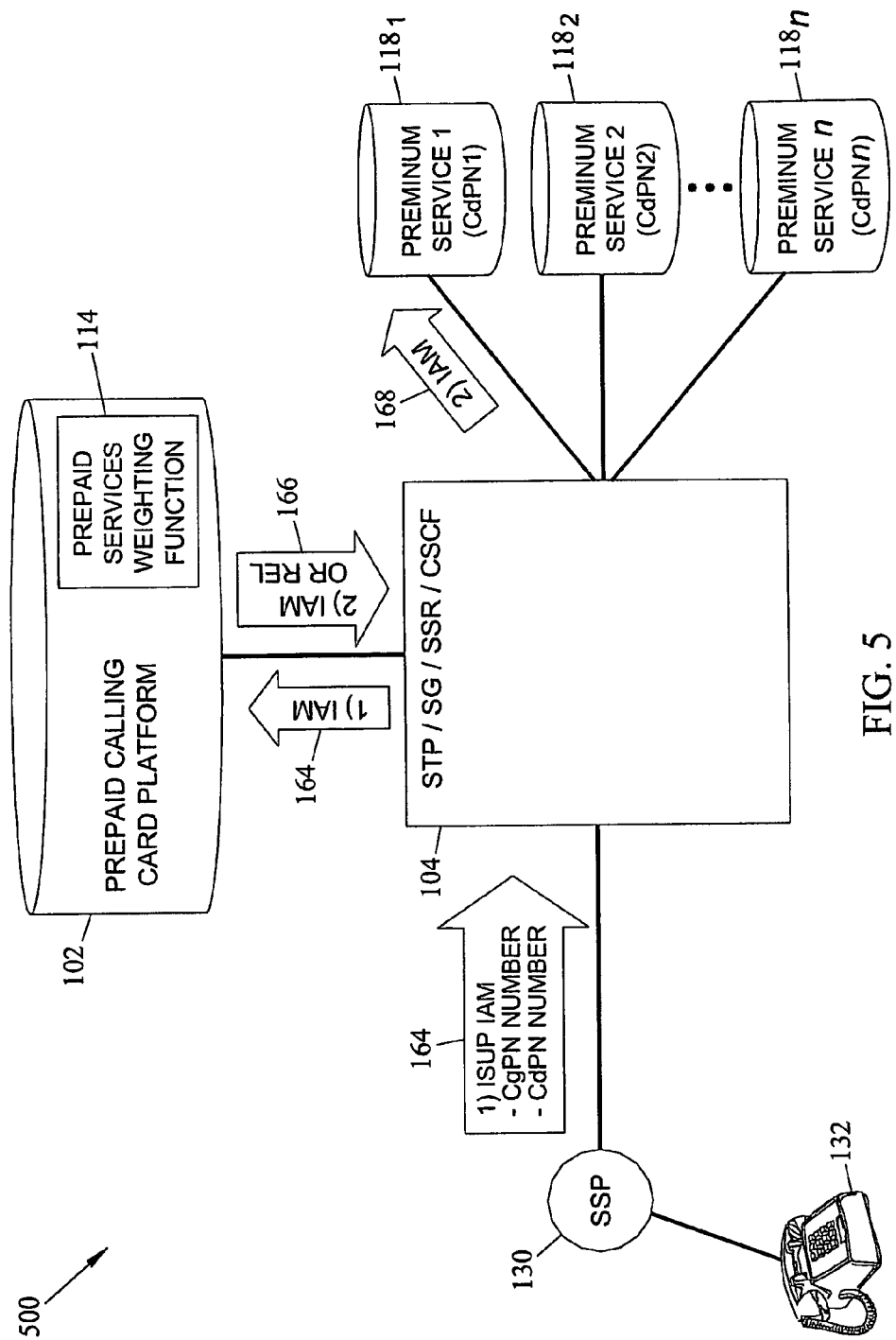
FIG. 5 is a network diagram that illustrates an exemplary communications network utilizing a prepaid service weighting function incorporated in a prepaid calling card platform according to an embodiment of the subject matter described herein.

Although the examples described above relate to applying prepaid weighting in mobile networks, the present subject matter may also be used to apply prepaid weighting in landline networks. FIG. 5 illustrates an exemplary landline communications network 500 utilizing a prepaid service weighting function that is incorporated in a prepaid calling card platform. Similar to FIG. 1, landline communications network 500 includes NRE 104, prepaid platform 102, and premium service platforms $118_{1 \ldots n}$. Communications network 500 also includes SSP 130 and PSWF 114 is positioned in prepaid platform 102. In this example, prepaid platform 102 assumed to be included in the voice path for prepaid calls. In one embodiment, SSP 130 receives a call initiation signal from calling device 132, where the call is being initiated using a prepaid calling card. In one embodiment, calling device 132 may include a landline telephone, mobile phone, a pay phone, and the like. SSP 130 transmits a call signaling message 164 (e.g., an ISUP IAM message) that contains a CgPN and a CdPN. The call signaling message 164 is received by prepaid platform 102 via NRE 104. Upon receiving the call signaling message, prepaid platform 102 determines the outstanding balance of credit (or time) associated with the prepaid subscriber. After determining the remaining prepaid credit, prepaid platform 102 uses PSWF 114 to determine if a credit adjustment factor can be applied to the call session. In one embodiment, PSWF 114 accesses one or more data structures in rules database 122 in order to determine which credit adjustment factor(s), if any, should be applied to the available credit value contained in call signaling message 164. PSWF 114 may use information contained in call signaling message 164, such as the called party identifier, the time of day, the type of service, and the like, in order to ascertain what credit adjustment factor should be used.

Once the appropriate credit adjustment factor is determined, prepaid platform 102 allows call signaling message 164 to continue to the premium services destination (e.g., premium service $118_1$) (see messages 166 and 168). However, prepaid platform 102 deducts credit (or minutes) based on the selected credit adjustment factor. For example, if a prepaid subscriber, who has 30 minutes available at a normal rate of $0.15 per minute, calls premium service $118_1$, the allotted amount of time is appropriately truncated. In this example, the allotted amount of "authorized" time amounts to 12 minutes (i.e., 30 minutes×0.4=12 minutes). Thus, the prepaid subscriber is able to utilize the prepaid account establish a call session with premium service $118_1$. Upon the expiration of the 12 minutes, prepaid platform 102 may send a release message to SSP 130 that is routed via NRE 104 in order to terminate the call. In one embodiment, a tone/announcement server (not unlike TAS 112 in FIG. 1) may be used in cooperation with prepaid platform 102 to provide an audible tone or verbal message that indicates the depletion of credit to the calling device 132.

In one embodiment, the present subject matter may be applied to a Session Initiation Protocol (SIP)-based communications network, such as an Internet protocol (IP) multimedia subsystem (IMS) network. IMS is defined by the Third Generation Partnership Project (3GPP) as a mobile network infrastructure that enables the convergence of data, speech, and mobile network technology over an IP-based infrastructure. IMS may be used to allow network operators to offer a standardized, reusable platform with new, innovative services by enhancing real time, multimedia mobile services, such as voice services, video telephony, messaging, conferencing, and push services. IMS can be used to provide services for both mobile networks and fixed networks at the same time, providing unique mixtures of services with transparency to the end-user.

Figure 6:
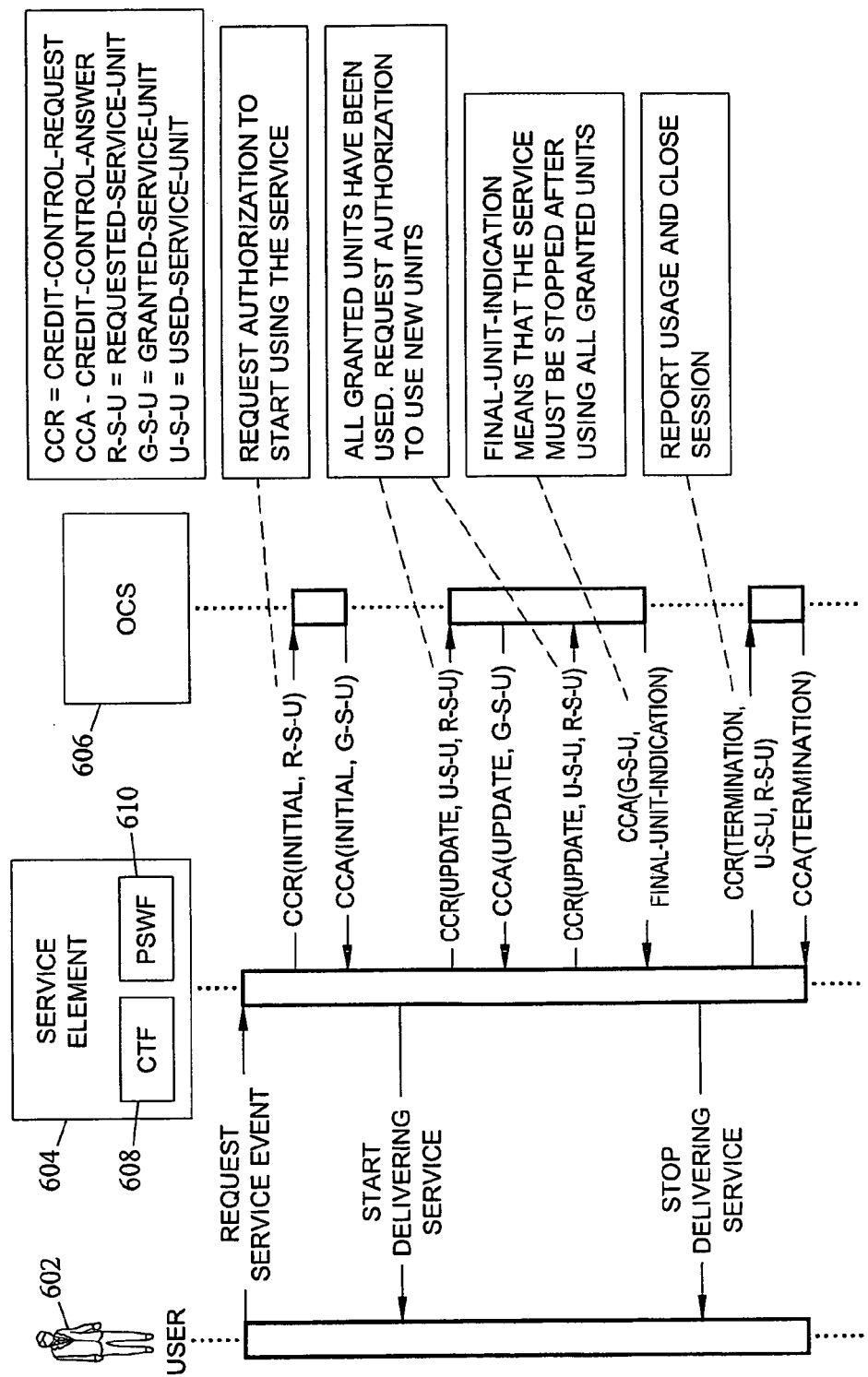
FIG. 6 is a message flow diagram that illustrates the functionality of a session initiation protocol (SIP) enabled session element configured to utilize a prepaid service weighting function according to an embodiment of the subject matter described herein.

FIG. 6 includes a message flow diagram that illustrates the functionality of a SIP enabled session element configured to utilize a prepaid service weighting function. FIG. 6 includes an IMS service element 604, such as an S-CSCF, which supports a charge trigger function (CTF) 608 and a prepaid services weighting function (PSWF) 610 that provides a function similar to that described in the previous, non-SIP/IMS embodiments (e.g., PSWF 114). Other examples of service elements include, but are not limited to, Proxy CSCF elements, Interrogating CSCF elements, SIP servers, SIP routers, SIP application servers, Presence servers, home subscriber server (HSS), softswitch elements, media gateway controller elements, and session border controller elements. Although depicted as separate and independent elements in FIG. 6, CTF 608 and PSWF 610 may be tightly integrated or combined in a single component in alternate embodiments. In one implantation, CTF 608 is associated with the triggering of a credit control request (CCR) for requesting prepaid service information/authorization/credits from an online charging system (OCS) 606 that may include prepaid services functionality. Namely, OCS 606 may include or have access to a prepaid services platform/system.

In one embodiment, user 602 transmits a request message to service element 604. In response, CTF 608 causes a CCR request (e.g., a requested service unit (RSU message) to be generated and sent to OCS 606. OCS 606 (or prepaid services system) responds with a credit control answer (CCA) message that includes a quantity of granted service units (GSUs). PSWF 610 is adapted to receive the GSU information and apply a credit adjustment factor based on PSWF call parameters that are similar to those previously described (e.g., based on called party ID, calling party ID, Request uniform resource identifier (URI), To: URI, From: URI, roaming network/carrier ID, time of day, day of week, etc.). Although not shown in FIG. 6, service element 604 may include a rules database that contains a plurality of data structures (not unlike database 122 with data structures 202-208 in FIG. 1). Once modified by at least one adjustment factor, the adjusted available GSU credit value may then be utilized by service element 604 to control the call or communication session. For example, as granted units or funds are used, service element 604 may issue additional CCR messages to request authorization from OCS 606 to use new units (not unlike using ACR messages in FIG. 1).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing variable rate prepaid telecommunications services, the method comprising:
   at a network routing element separate from a prepaid platform that maintains prepaid account balances for prepaid subscribers, wherein the network routing element is configured to receive, modify, and route signaling messages:
   receiving a signaling message from the prepaid platform that includes an available credit value associated with a prepaid communications session initiated by a prepaid calling party subscriber to a premium service called party destination, wherein the signaling message is sent by the prepaid platform as a response message directed to a query message originator via the network routing element in reply to a query message sent by the query message originator to the prepaid platform via the network routing element, wherein the prepaid calling party subscriber has a static prepaid calling rate established at the prepaid platform that is applied to mobile originated prepaid communication sessions initiated by the prepaid calling party subscriber, and wherein the premium service called party destination is associated with a calling rate that differs from the static prepaid calling rate;
   determining a credit adjustment factor based on the premium service called party destination;
   applying the credit adjustment factor to the available credit value to generate an adjusted available credit value;
   modifying the signaling message received from the prepaid platform to include the adjusted available credit value; and
   transmitting the modified signaling message including the adjusted available credit value to the query message originator.

2. The method of claim 1 wherein the available credit value includes at least one of an amount of time and an amount of credit.

3. The method of claim 1 wherein determining a credit adjustment factor includes determining a credit adjustment factor based on a called party identifier being associated with a premium service provider.

4. The method of claim 1 wherein determining a credit adjustment factor includes determining a credit adjustment factor based on the prepaid communications session being initiated during at least one of a specific time of day and a day of week.

5. The method of claim 1 wherein determining a credit adjustment factor includes determining a credit adjustment factor based on a network operator identity that processes at least a portion of the prepaid communications session.

6. The method of claim 1 wherein determining a credit adjustment factor includes determining a credit adjustment factor based on a prepaid subscriber corresponding to a calling party number in the signaling message.

7. The method of claim 1 comprising:
   transmitting the modified signaling message to a mobile switching center that initiated the prepaid communications session.

8. The method of claim 1 comprising:
   generating an accounting record that identifies the prepaid communications session and reflects the available credit adjustment.

9. The method of claim 1, wherein the call signaling message and the communications session include respective a session initiation protocol (SIP) message and a SIP communications session.

10. A method for providing variable rate prepaid telecommunications services, the method comprising:
    at an IP multimedia subsystem (IMS) service element separate from an online charging system (OCS) that maintains prepaid account balances for prepaid subscribers:
    receiving, from the OCS, a credit control answer message that includes a quantity of granted service units (GSUs) associated with a prepaid session initiation protocol (SIP)-based communications session initiated by a prepaid calling party subscriber to a premium service called party destination, wherein the prepaid calling party subscriber has a static prepaid calling rate established at the OCS that is applied to mobile originated prepaid communication sessions initiated by the prepaid calling party subscriber, and wherein the premium service called party destination is associated with a calling rate that differs from the static prepaid calling rate;
    determining a credit adjustment factor based on the premium service called party destination;
    determining an available GSU credit value corresponding to a prepaid subscription using the quantity of GSUs;
    applying the credit adjustment factor to the available GSU credit value received from the OCS to generate an adjusted available GSU credit value; and
    controlling a duration of the SIP-based communications session based on the adjusted available GSU credit value, wherein controlling the duration of the SIP-based communications session includes issuing a credit control request (CCR) message to the OCS to request authorization to use additional GSUs to extend the duration of the SIP-based communications session.

11. The method of claim 10 wherein the available GSU credit value includes at least one of an amount of time and an amount of credit.

12. The method of claim 10 wherein determining a credit adjustment factor includes determining a credit adjustment factor based on a called party identifier being associated with a premium service provider.

13. The method of claim 10 wherein determining a credit adjustment factor includes determining a credit adjustment factor based on the prepaid SIP-based communications session being initiated during at least one of a specific time of day and a day of week.

14. The method of claim 10 wherein determining a credit adjustment factor includes determining a credit adjustment factor based on a network operator identity that processes at least a portion of the prepaid SIP-based communications session.

15. The method of claim 10 wherein determining a credit adjustment factor includes determining a credit adjustment factor based on a prepaid subscriber corresponding to a calling party identifier in the credit control answer message.

16. A prepaid services weighting function system for providing variable rate prepaid telecommunications services, the system comprising:
a network routing element separate from a prepaid platform that maintains prepaid account balances for prepaid subscribers, wherein the network routing element is configured to receive, modify, and route signaling messages, the network routing element including:
a screening function for identifying a signaling message received from the prepaid platform as requiring prepaid service weighting processing;
a prepaid services weighting function for receiving the identified signaling message that includes an available credit value associated with a prepaid communications session initiated by a prepaid calling party subscriber to a premium service called party destination, wherein the signaling message is sent by the prepaid platform as a response message directed to a query message originator via the network routing element in reply to a query message sent by the query message originator to the prepaid platform via the network routing element, wherein the prepaid calling party subscriber has a static prepaid calling rate established at the prepaid platform that is applied to mobile originated prepaid communication sessions initiated by the prepaid calling party subscriber, and wherein the premium service called party destination is associated with a calling rate that differs from the static prepaid calling rate, determining a credit adjustment factor based on the premium service called party destination, applying the credit adjustment factor to the available credit value to generate an adjusted available credit value, and modifying the signaling message received from the prepaid platform to include the adjusted available credit value; and
wherein the network routing element transmits the modified signaling message including the adjusted available credit value to the query message originator.

17. The system of claim 16 wherein the available credit value includes at least one of an amount of time, an amount of credit, and a currency amount.

18. The system of claim 16 wherein the prepaid service weighting function is further adapted to determine a credit adjustment factor based on a called party identifier being associated with a premium service provider.

19. The system of claim 16 wherein the prepaid service weighting function is further adapted to determine a credit adjustment factor based on the prepaid communications session being initiated during at least one of a specific time of day and a day of week.

20. The system of claim 16 wherein the prepaid service weighting function is further adapted to determine a credit adjustment factor based on a network operator identity that processes at least a portion of the prepaid communications session.

21. The system of claim 16 wherein the prepaid service weighting function is further adapted to determine a credit adjustment factor based on a prepaid subscriber corresponding to a calling party identifier in the signaling message.

22. The system of claim 16 the prepaid service weighting function is further adapted to transmit the modified signaling message to a mobile switching center that initiated the prepaid communications session.

23. The system of claim 16 the prepaid service weighting function is further adapted to generate an accounting record that identifies the prepaid communications session and reflects the available credit adjustment.

24. The system of claim 16, wherein the signaling message and the communications session include respective a session initiation protocol (SIP) message and a SIP communications session.

25. A non-transitory computer readable medium having stored thereon computer executable instructions that when executed by a processor of a computer performs steps comprising:
at a network routing element separate from a prepaid platform that maintains prepaid account balances for prepaid subscribers, wherein the network routing element is configured to receive, modify, and route signaling messages:
receiving a signaling message from the prepaid platform that includes an available credit value associated with a prepaid communications session initiated by a prepaid calling party subscriber to a premium service called party destination, wherein the signaling message is sent by the prepaid platform as a response message directed to a query message originator via the network routing element in reply to a query message sent by the query message originator to the prepaid platform via the network routing element, wherein the prepaid calling party subscriber has a static prepaid calling rate established at the prepaid platform that is applied to mobile originated prepaid communication sessions initiated by the prepaid calling party subscriber, and wherein the premium service called party destination is associated with a calling rate that differs from the static prepaid calling rate;
determining a credit adjustment factor based on the premium service called party destination;
applying the credit adjustment factor to the available credit value to generate an adjusted available credit value;
modifying the signaling message received from the prepaid platform to include the adjusted available credit value; and
transmitting the modified signaling message including the adjusted available credit value to the query message originator.

\* \* \* \* \*